Patented Sept. 14, 1937

2,093,105

UNITED STATES PATENT OFFICE 2,093,105

ADHESIVE

Ivan Wolff, New York, N. Y.

No Drawing. Application November 1, 1935,
Serial No. 47,799

5 Claims. (Cl. 134—17)

This invention relates to envelope manufacture, and deals with that type of envelope which has a sealing flap and another part each carrying an adhesive surface always in tacky condition, whereby when the two surfaces are contacted and pressed together they will cohere, but with the surfaces so constituted that neither will adhere to paper. In such an envelope, when it is sealed, there is no need of moistening the sealing adhesive; and, furthermore, the sealed envelope is only difficultly, if at all, capable of being wrongfully opened.

The object of the invention is to provide an improved adhesive for such an envelope, hereinafter called a self-sealing envelope, and to provide an adhesive such that by the use thereof a self-sealing envelope can be made which will prevent surreptitious opening of the sealed envelope without leaving some certain evidence of unauthorized tampering therewith.

Various adhesives of the kind above described have heretofore been proposed. A number of these have sought to incorporate some form of rubber so mixed with one or more additions that if spread and allowed to set into a self-sustaining film, such film is stretchable to a considerable extent, and substantially to the same extent as a film formed from spread rubber latex or such latex and a resin or resins, without breaking the film. While the film of the present invention also incorporates rubber latex, it has a novel addition which adequately meets certain serious problems which have not to my knowledge been properly or at all considered in previous proposals.

One of these problems is to obtain an adhesive which, when employed to give two cooperative adhesive surfaces of the kind above described, will allow one of these surfaces to be cohered with another by pressure, but in a way not only to prevent any subsequent parting of the two surfaces, but also to have each of said surfaces truly inseparably bonded to its paper support. Another of these problems is to provide such an adhesive, and one which at the same time cannot be even peelingly removed from its paper support, either absolutely, or certainly without tearing away with it so much of the paper body as to allow the resulting damage to the paper to be visible to the naked eye. Another of these problems is to retain the proper tackiness in the spread adhesive surface, while holding down, much more than heretofore, the elastic stretchability of any portion of such surface, so that such surface portion, even though it result from a rubber containing adhesive, will break after a comparatively small degree of stretch thereof following or incidental to any successful attempt, however performed, to bring about some parting between said surface and its support. Another of these problems is to provide a rubber containing adhesive such that after an adhesive surface or film is laid therefrom the tackiness at the base of such film will be held down to a point where if a portion of such film is parted from the support, said portion cannot be pressed back against the support so as again to adhere thereto. Another of these problems is to provide a rubber containing adhesive spreadable as a tacky film, yet one having a top "hardness", to adopt for convenience an adjective of perhaps doubtful aptness, such as to allow one of such films, although tacky enough to be readily cohereable with another similar film when these two are pressed together, to be merely slid over such similar film without danger of one film sticking to the other.

It is one of the objects of the present invention to provide an adhesive of the kind to which the invention pertains, and which will adequately meet all the foregoing problems.

Another object is to provide such an adhesive, and one which is easy and inexpensive of manufacture.

Another object is to provide such an adhesive, and one which can be practicably handled during application to different paper parts of an envelope.

According to the present invention, the adhesive contains rubber latex having commingled therewith powdered mica, desirably very finely ground. Preferably, the mica is water-ground, to get as fine and as uniform particles as possible.

Best results have so far been obtained when the rubber (in the form of latex containing from 40% to 60% solids) is approximately 75% by weight of the mixture, with the mica constituting the remaining approximately 25%. Depending on the results desired, the amount of mica incorporated can be considerably higher than 25%, or run down to approximately 10%, of the weight of the mixture.

In preparing the adhesive, the mica powder is distributed through the ruber latex by stirring. While there has been observed some tendency of a noticeable portion of the latex to collect above a considerable portion of the latex-coated mica content of the adhesive after prolonged setting of the mixture, aparently a very slight agitation readily properly redistributes the mica particles,— such an agitation, for instance, (to refer now to apparatus familiar in the art of envelope making machines), as would result from turning of the rollers or the like in the same hopper with the adhesive and acting as feeders to transfer the adhesive to the felt pads or the like employed as adhesive applicators to the envelopes being fabricated in such machines.

The remarkable efficacy of the powdered mica addition in providing an adhesive meeting all the requirements hereinabove indicated, lies, according to my present theory, partly in its unique ability to provide in the rubber latex a viscosity affecting, a tackiness controlling and an elasticity reducing agent, which thus functions because it is not only inert and non-absorbent but has other characteristics unique to mica powder. Due to its tiny cracks and its own specific gravity, it strikes that exact balance required between a certain degree of floatability in the latex while the adhesive is setting into a film, and a sluggishness of movement in the latex while thus setting as a result of the penetration of the latex well into the mica particles by way of said cracks. Due to this balance, enough of the mica particles remain suitably diffused through the film to reduce its stretchability to the extent and in the situation hereinabove explained; at the same time enough of the mica particles remain or cluster near the top of the film so to affect the tackiness at the very top surface thereof as to allow that free sliding of the film over another similar film hereinabove mentioned; yet enough of the mica particles remain or cluster at the very bottom of the film to perform the extremely important function referred to in the sentence immediately following. Such mica particles as are near the bottom of the film, by virtue of the knife-like edges of the striations establishing the aforesaid cracks, actually dig into the cellular structure of the paper and entangle themselves and their coatings of latex with the paper fibres in a maner to become inseparably bonded to the paper. Finally, if in some way or by some technique one of the films is partialy parted from its support, the paper particles carried away therewith, due to the behavior of the mica particles as last described, apparently are always distributed in such spacing and amount as to prevent subsequent readherence of the film to its support.

I claim:

1. An adhesive for self-sealing envelopes, said adhesive consisting principally of rubber (in the form of latex containing from 40% to 60% solids), over fifty per cent. by weight of the adhesive; the remainder of the adhesive being mainly powdered mica.

2. An adhesive for self-sealing envelopes, said adhesive consisting principally of rubber (in the form of latex containing from 40% to 60% solids), approximately 75% to 90% by weight; and powdered mica, approximately 25% to 10% by weight.

3. An adhesive for self-sealing envelopes, said adhesive consisting principally of rubber (in the form of latex containing around 50% solids), approximately 75% by weight; and powdered mica, approximately 25% by weight.

4. An adhesive for self-sealing envelopes, consisting essentially of rubber in the form of latex, and a proportion of powdered mica not exceeding 25% by weight of the rubber.

5. An adhesive for self-sealing envelopes, consisting essentially of rubber in the form of latex and a proportion of water-ground mica not exceeding 25% by weight of the rubber.

IVAN WOLFF.